United States Patent [19]
Bell et al.

[11] Patent Number: 5,422,989
[45] Date of Patent: Jun. 6, 1995

[54] USER INTERFACE MECHANISM FOR INTERACTIVELY MANIPULATING DISPLAYED REGISTERED IMAGES OBTAINED FROM MULTIPLE SENSORS HAVING DIVERSE IMAGE COLLECTION GEOMETRIES

[75] Inventors: David M. Bell, Palm Bay; Joseph K. Bryan, West Melbourne, both of Fla.

[73] Assignee: Harris Corporation, Melbourne, Fla.

[21] Appl. No.: 980,501

[22] Filed: Nov. 23, 1992

[51] Int. Cl.⁶ ............................................. G06F 15/62
[52] U.S. Cl. .................................................. 395/133
[58] Field of Search ............... 395/136, 137, 138, 139, 395/133, 135; 345/118, 113, 117

[56] References Cited

U.S. PATENT DOCUMENTS

| | | | |
|---|---|---|---|
| 4,645,459 | 2/1987 | Graf et al. | 434/43 |
| 4,847,788 | 7/1989 | Shimada | 364/522 |
| 5,278,950 | 1/1994 | Takei et al. | 395/134 |
| 5,315,692 | 5/1994 | Hansen et al. | 395/119 |

*Primary Examiner*—Phu K. Nguyen
*Attorney, Agent, or Firm*—Charles E. Wands

[57] ABSTRACT

A screen-to-registration surface interface translates coordinate system parameters associated with screen-base image manipulation software to latitude and longitude parameters of a co-registration surface-based coordinate system. By invoking a data file linking mechanism of the 'windows'-based display and manipulation software, the user may specify a given image manipulation operation to be executed with respect to plural images that have been imported into respective windows of the display. The registration surface coordinate system parameters are compatible with image collection geometry models. These values are then transformed by the respective collection geometry models to the respective digital image files of the linked images. To display these new pixel values, the geometry models associated with the respective digital images imported to the display screen are mapped by a cascaded mapping function, which cascades the image database-to-registration surface translation of the collection geometry model with the registration surface-to-screen coordinate transform, thereby coupling the new pixel values at the image array locations in the database specified by the manipulation parameters to the output display for exploitation by the user.

26 Claims, 4 Drawing Sheets

USER INTERFACE MECHANISM FOR INTERACTIVELY MANIPULATING DISPLAYED REGISTERED IMAGES OBTAINED FROM MULTIPLE SENSORS HAVING DIVERSE IMAGE COLLECTION GEOMETRIES

CROSS-REFERENCE TO RELATED APPLICATIONS

The present application relates to subject matter disclosed in our co-pending U.S. patent application Ser. Nos. 07/982,071 and 07/980,500, filed on even date herewith, respectively entitled "Mechanism for Registering Digital Images Obtained from Multiple Sensors Having Diverse Image Collection Geometries," and "User Interface Mechanism for Interactively Setting Differential Elevation of 'Micro-relief' Registration Surface for Registering Images Obtained from Multiple Sensors Having Diverse Image Collection Geometries," assigned to the assignee of the present application and the disclosures of which are herein incorporated.

FIELD OF THE INVENTION

The present invention relates in general to image processing systems, and is particularly directed to a user interface mechanism that allows multiple digital images of an object, such as terrestrial images obtained by a plurality of spaceborne or airborne sensors having differing image collection parameters, to be simultaneously manipulated, such as by pan (roam or translate), zoom and rotate operations, that are executed with respect to a prescribed multi-image co-registration surface.

BACKGROUND OF THE INVENTION

As described in the above-referenced co-pending application entitled "Mechanism for Registering Digital Images Obtained from Multiple Sensors Having Diverse Image Collection Geometries", an a priori requirement of the successful exploitation of information contained in multiple images of a scene, such as spaceborne or airborne derived images of the earth, is the mutual registration or alignment of the images. Unfortunately, this requirement is not easily fulfilled when the images to be co-registered are derived from diverse types of sensors, such as those having different wavelength sensitivities and observation and collection geometries. Indeed, it is often the case that multiple images of the same terrestrial area are obtained by the same sensor at different times (seasons) of the year.

Advantageously, the invention described in the above-referenced co-pending application entitled "Mechanism for Registering Digital Images Obtained from Multiple Sensors Having Diverse Image Collection Geometries" successfully addresses this problem by employing an image processing mechanism which correlates the edge content of reduced sized neighborhoods of pixels distributed throughout digital images to be mutually aligned. The digital images upon which the correlation mechanism operates are obtained by projecting or translating originally obtained images to a prescribed registration surface, such as a terrestrial image plane, using geometry projection parameters of the respective image collection systems from which the original images were obtained. Then, based upon a neighborhood correlation of edge content, an estimate is derived of the misregistration of the two digital images in the registration surface. This misregistration estimate is employed to modify either or both of respective sets of parameters through which the collection geometries of the image collection sensors are defined, thereby improving the degree of co-registration of the respective projections of the two original images upon the registration surface. Once the parameters of the geometric models of the image collection sensors have been updated, the neighborhood correlation process is repeated for increasingly higher spatial resolution versions of each of the two images up to and including the original, highest spatial resolution versions of the two terrestrial image plane-referenced images, so as to iteratively refine the geometric models of the sensors and thereby further improve mutual registration of the two images on the registration image surface. Upon completion of this iterative process, the parameters of the geometric models will have been effectively optimized, so that co-registration of images of any of the available spatial resolution images derived from the modelled sensors may be conducted.

The database addresses of the pixels of a respective image to be displayed for co-registration with other images and examination by the user are generated in accordance with operator specified coordinates within the registration surface (e.g. latitude and longitude of the confines of the area of a terrestrial registration surface). Namely, for a given sensor, its associated geometry model transforms pixel coordinates in the digital image space to coordinates within a prescribed co-registration surface. Thus, for the case of a terrestrial image obtained from a satellite sensor, the associated geometry model will effectively translate the respective line and pixel locations of the spatial array of pixels that make up the digital image to corresponding latitude and longitude coordinates on a predefined geographical surface having a prescribed base elevation characteristic (e.g. a planar ground elevation surface).

To facilitate exploitation of the information contained in the images, multiple image files that have been selectively accessed by the user from a workstation database for display and manipulation (e.g. pan or roam, zoom and rotate) are preferably imported into a 'window'-based user interface, such as SunOS Open Windows Version 3.0, identified in the above identified co-pending application entitled "Mechanism for Registering Digital Images Obtained from Multiple Sensors Having Diverse Image Collection Geometries", which allows the user to rapidly import and move among the plural images of interest (for example, by means of customarily employed 'point and click' selections of screen-based user interface icons).

The refined geometry models of the respective sensors from which the digital images have been derived are then employed to inversely translate operator-specified latitude and longitude coordinates in the registration surface into line and sample coordinates of the images stored within the respective image databases and thereby identify which pixels in a respective image database are to be mapped to the display screen. Mapping from the image database to the display screen is effected by a cascaded mapping function, which cascades the image database-to-registration surface translation of the collection geometry model with a registration surface-to-screen coordinate transform. Through this cascaded mapping function, the pixel values at specified image array locations in the database are coupled to an output display driver for presentation as one of a set of images that are co-registered in the prescribed registration surface for exploitation by the user.

When viewing such a set of co-registered images, the image analyst often desires to manipulate the images, for example, by zooming in on a particular area, rotating the image, or panning (roaming) through the image. Unfortunately, because the image manipulation tools currently available for image processing applications are screen-based mechanisms (customarily employed for graphics display applications), which operate exclusively in the two-dimensional coordinate system of the display screen, they are effectively dissociated from the co-registration surface, and therefore cannot successfully be employed to manipulate co-registered images that have been projected or translated (by means of a collection geometry model) on such a co-registration surface, such as a terrestrial surface.

As a consequence, if the exploiter were to attempt to manipulate images (derived from sensors located in a three-dimensional coordinate system with respect to the object being imaged, such as terrestrial images captured by a satellite or airborne sensor), in a currently active window using screen-based image processing software, he would be limited to manipulating the pixels on the screen in accordance with the two-dimensional coordinate system of the screen itself, and would not achieve the intended manipulation of the image in the registration surface of interest, such as a ground elevation surface in the case of terrestrial images; it is within the registration surface that manipulation of the images must be effected.

SUMMARY OF THE INVENTION

In accordance with the present invention, the effective lack of utility of conventional screen-based image manipulation tools to multi-image registration applications, such as those involving multiple digital terrestrial images obtained by a plurality of spaceborne or airborne sensors having differing image collection geometries, which are to be simultaneously manipulated with reference to a common image registration surface, is successfully remedied by a registration surface-based image manipulation operator. Because the manipulation operator is registration surface-based, rather than screen-based, it allows the exploiter to accurately manipulate one image, or a plurality of images simultaneously, in a manner that maintains registration of the images in the intended co-registration surface, and thereby allows the operator to perform a true image information content examination associated with the exploitation process.

For this purpose, the present invention involves employing a screen-to-registration surface interface or translation operator, which translates (x or horizontal, and y or vertical) coordinate system parameters associated with screen-base image manipulation software to (phi or latitude, and lambda or longitude) parameters of the co-registration surface-based coordinate system. By invoking a data file linking mechanism of the 'windows'-based display and manipulation software, that allows a given user-selected screen parameter to propagate among multiple files (here multiple images), the user may specify a given image manipulation operation to be executed with respect to plural images that have been imported into respective windows of the display. The screen coordinate system-to-registration surface coordinate system translator converts the requested manipulation parameters input by the operator into registration surface values that are compatible with the collection geometry model. These values are then transformed by the respective collection geometry models to the respective digital image files of the linked images.

For example, if the operator desires to rotate the co-registered images presented on the display, the requested rotation specified in screen coordinates (degrees clockwise or counter-clockwise relative to vertical) is transformed to a given azimuth value relative to North in the terrestrial co-registration surface. If the operator desires to pan or roam through the co-registered images presented on the display, the selected screen-based x/y direction (executed for example by a mouse device point, click and drag operation) is converted into a given geographical direction (in terms of latitude and longitude bearings) and rate of travel (e.g. meters or feet per unit time (minute)) across the terrestrial co-registration surface. Similarly, if the operator desires to enlarge or zoom-in on the co-registered images presented on the display, the specified screen magnification is converted into a given spatial resolution between pixels (for example, in meters or yards) on the registration surface. In other words, all display screen-based image manipulation parameters are converted to parameters defined in terms of the (geographical) coordinates of the co-registration surface, which are compatible with the translation parameters of the refined image collection geometry models.

These co-registration surface-based image manipulation parameters, when applied to the image collection geometry models of the respective images being co-registered, are inversely translated or mapped by the geometry model from the coordinate system of the co-registration surface into line and pixel coordinates of the image space associated with the respective digital images. To display these new pixel values, the geometry models associated with the respective digital images imported to the display screen are mapped by a cascaded mapping function, which cascades the image database-to-registration surface translator of the collection geometry model with the registration surface-to-screen coordinate transform, thereby coupling the new pixel values at the image array locations in the database specified by the manipulation parameters to the output display for exploitation by the user.

DETAILED DESCRIPTION

Before describing in detail the registration surface-based image manipulation operator of the present invention, it should be observed that the invention resides primarily in what is effectively an augmentation of the multi-image registration software described in the above-referenced co-pending patent application entitled "Mechanism for Registering Digital Images Obtained from Multiple Sensors Having Diverse Image Collection Geometries". Consequently, the configuration of such a system and the manner in which it is interfaced with a digital image color output device (e.g. eight bits per pixel color display) have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and the image processing diagrams of the Figures are primarily intended to illustrate the major components of the system in a convenient functional grouping, and an example of the application of the image processing operator of the present invention to an illustrative example, whereby the present invention may be more readily understood.

Figure 1:
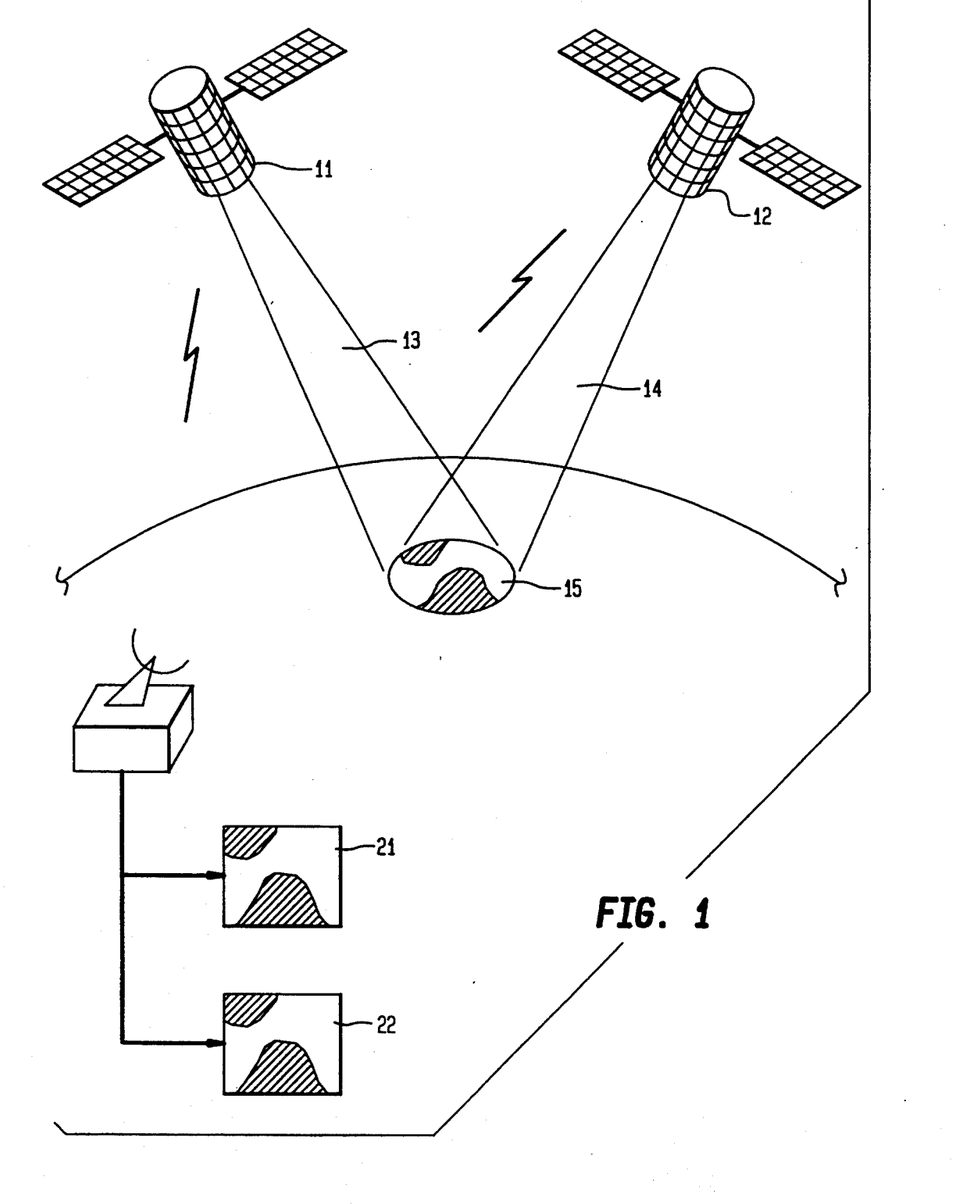
FIG. 1 diagrammatically illustrates a pair of image sensors which collect images of the earth and having image collection fields of view which observe a common area of the earth's surface.

In our above-referenced co-pending application entitled "Mechanism for Registering Digital Images Obtained from Multiple Sensors Having Diverse Image Collection Geometries", examples of images to be processed are those which correspond to images of the earth, collected by a pair of satellite-based image sensors 11 and 12, diagrammatically illustrated in FIG. 1 as having respective image collection fields of view 13 and 14, which observe a common area or scene 15 of the earth's surface. Sensors 11 and 12 are not limited to any particular type, and may comprise any of a variety of spaceborne or airborne imaging systems, including, but not limited to Landsat-type (multi-spectral) mapping cameras, Spot-type (visual) imagers, etc., customarily employed for terrestrial image mapping.

The original images as captured by sensors 11 and 12 are either output directly or converted into first and second digital images 21 and 22, respectively having a prescribed (relatively high) spatial resolution (e.g. on the order of 6144×4096 pixels square for image 21 and on the order of 8192×6144 pixels square for image 22) encoded as respective digital image files to a predefined digital encoding resolution (e.g. eight bits per color per pixel or twenty four bits per pixel).

Figure 2:
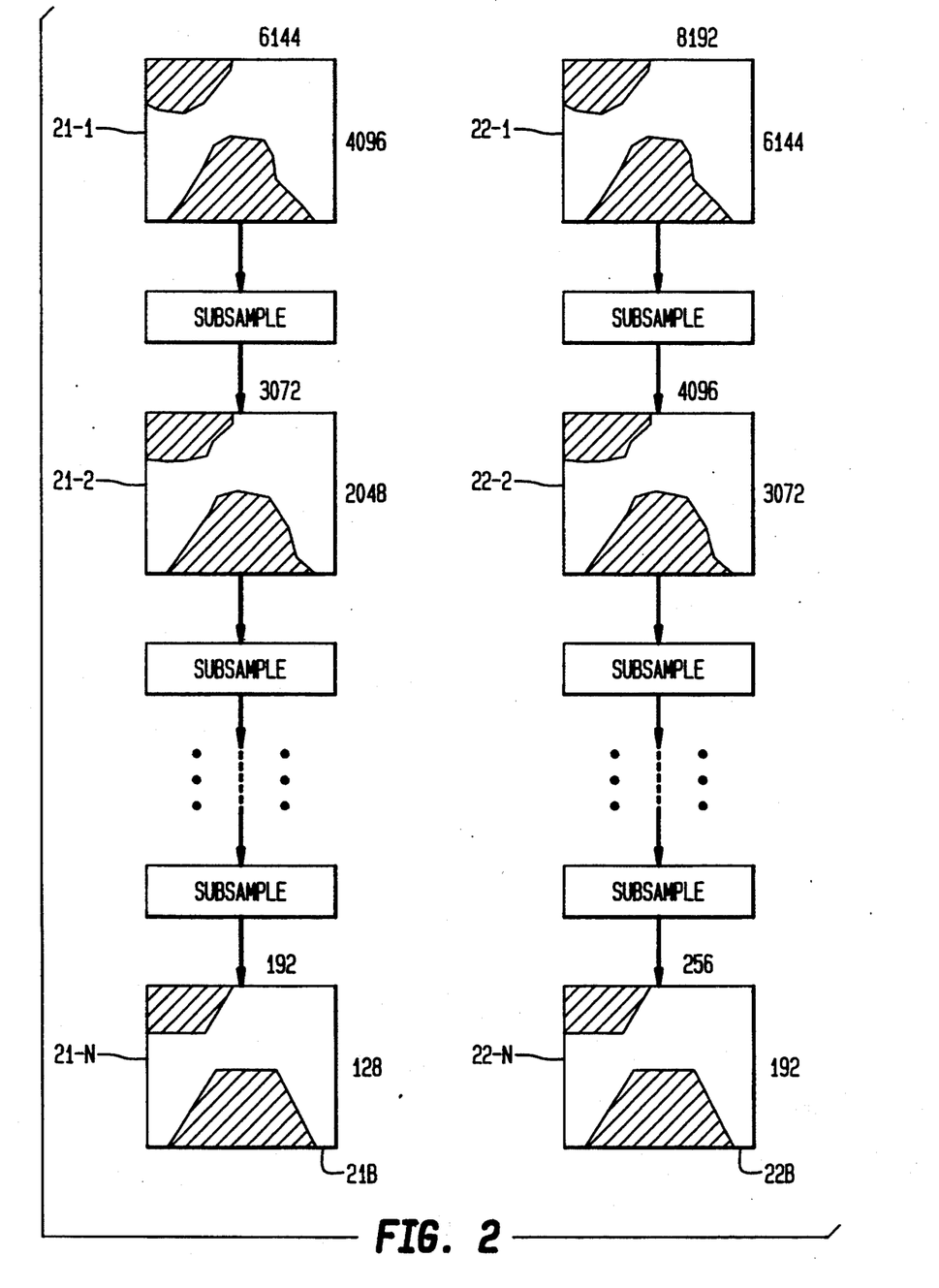
FIG. 2 diagrammatically illustrates the manner in which each of original images derived from separate sensors of FIG. 1 is subjected to sequential subsampling to obtain reduced spatial resolution versions of each of the original images.

As diagrammatically illustrated in FIG. 2, each of these original images 21 and 22 is subjected to sequential subsampling or decimation, in order to obtain reduced spatial resolution data sets, or plural versions of each of the original digital images, having successively reduced spatial resolutions from the relatively high definition spatial resolution of the original images to some lowest spatial or base resolution. This successive decimation scheme is shown as producing what are commonly referred to as pyramids 25, 26 of reduced resolution images 21-1 . . . 21-N and 22-1 . . . 22-N, namely plural differential spatial resolution versions of each of digital images 21 and 22, having successively reduced spatial resolutions from the relatively high definition spatial resolution of original images 21 (e.g. 6144×4096 pixels square) and 22 (e.g. 8192×6144 pixels square) down to a prescribed base resolution of images 21-N, 22-N, (for example, on the order of 128×192 pixels square for image 21-N, and 256×192 pixels square for image 22-N), identified as base resolution images 21B, 22B. The contents of the respective ones of the multiple resolution image files, from the high resolution images 21-1, 22-1 through the base resolution images 21B, 22B, may be output to an associated two-dimensional display in accordance with a prescribed digitized image file-to-display mapping mechanism, which effects a resampling scan of the (line and pixel) contents of the selected resolution database and outputs the resampled data to the output display driver.

As pointed out briefly above, all digital images processed in accordance with the registration matching mechanism of the above-referenced co-pending application entitled "Mechanism for Registering Digital Images Obtained from Multiple Sensors Having Diverse Image Collection Geometries", regardless of their respective spatial resolutions, are translated to a prescribed (co-registration) surface, using geometrical models of the sensors through which the images have been obtained (11 and 12 in the present example). As a non-limitative example of a collection geometry model that may be employed in the case of imagery data obtained from the SPOT satellite, referenced above, the model described in detail in an article by A. Lee entitled "SPOT Satellite Sensor Model Design" supplied as Appendix C in that application may be used. It should be observed however, that this particular model of the SPOT satellite collection geometry is merely given as an example. Other models may also be used for this particular satellite and, in the case of other sensors, each will have its own model. What is required, regardless of the image collection system employed, is that the model perform a transformation or translation of line and pixel coordinates of the captured or sensed image to terrestrial coordinates (in terms of latitude and longitude) of a reference (co-registration) surface having a prescribed base elevation, such a terrestrial ground plane.

Figure 3:
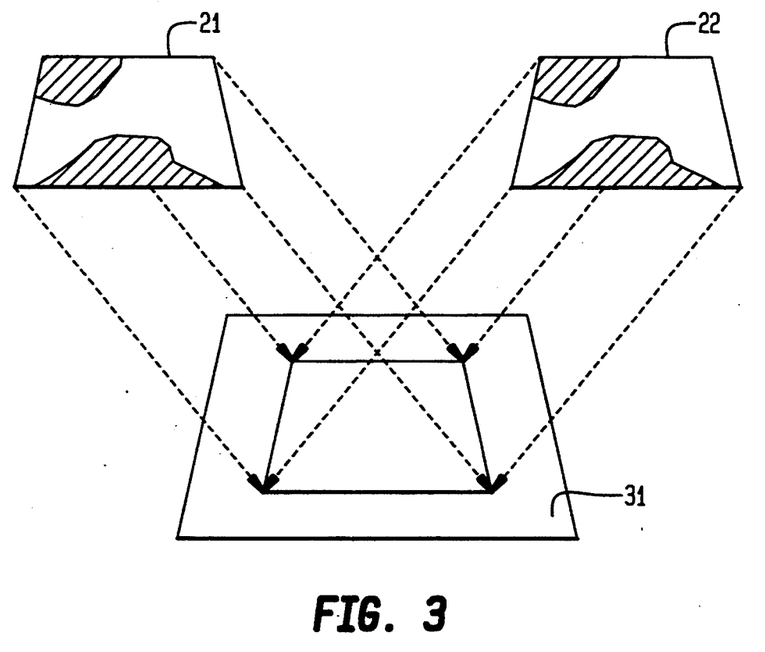
FIG. 3 diagrammatically illustrates co-registration plane upon which images obtained by the sensors of FIG. 1 are translated for image matching or registration processing.

When the iterative co-registration correlation process described in our co-pending application entitled "Mechanism for Registering Digital Images Obtained from Multiple Sensors Having Diverse Image Collection Geometries" has been completed, the geometry models of sensors 11 and 12 are effectively optimized for translating each pixel in the multi-resolution databases 21, 22 to a latitude (denoted by phi) and longitude (denoted by lambda) value within a co-registration surface 31, diagrammatically illustrated in FIG. 3, co-registration surface 31 having some a priori base elevation contour. It should observed, however, that the contour of the co-registration surface (terrestrial ground surface 31, in the present example) need not be of any particular shape (e.g. planar), but may be mathematically defined to include changes in elevation across its surface; namely its three-dimensional contour is definable in terms of latitude (phi), longitude (lambda) and elevation (h). For terrestrial images, the registration surface may comprise a surface whose characteristics are defined in accordance with digital terrain elevation data provided by the Defense Mapping Agency.

When images are to be displayed, the contents of their respective image files are accessed using the line-/pixel-to-latitude/longitude translation operator that has been established in accordance with the update geometry model obtained by the process described in the above-referenced application entitled "Mechanism for Registering Digital Images Obtained from Multiple Sensors Having Diverse Image Collection Geometries." In effect, the spatial coordinates of a given area of terrain within the co-registration surface are applied to an inverse or complement of the optimized geometry model translation operator in order to determine which pixels within an image's database are to be resampled and mapped to pixels of the display screen. Since the geometry models for the respective sensors have been optimized relative to the co-registration surface 31, then the inverse translation operator will access pixel values from a respective image database using as input parameters specified by the operator in terms of the co-registration surface that has been used during the optimization process.

Figure 4:
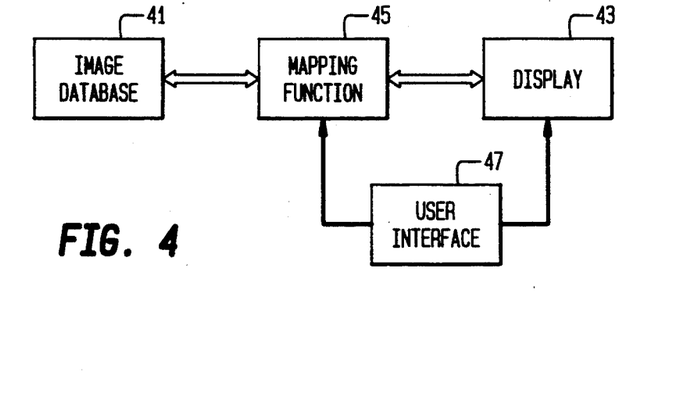
FIG. 4 diagrammatically illustrates a mapping function operator which maps database addresses of pixels of a respective image file with pixels coordinates of a display screen.

More particularly, as diagrammatically illustrated in FIG. 4, database addresses of the pixels of a respective image stored in memory 41 to be displayed on a display screen 43 in co-registration with other images and examination by the user are mapped to the screen by a mapping function 45. Mapping function 45 accesses the contents of database 41 via a user interface 47 through which the operator specifies parameters within the registration surface 31 (e.g. latitude and longitude of the confines of the area of a terrestrial registration surface). For a given sensor, its associated geometry model, which is contained within the mapping function 45, transforms pixel coordinates in the digital image space 41 to coordinates within co-registration surface 31. For the case of a terrestrial image obtained from a satellite sensor, the associated geometry model will effectively translate the respective line and pixel locations of the spatial array of pixels that make up the digital image 41 to corresponding latitude and longitude coordinates on the terrestrial co-registration surface 31.

Figure 5:
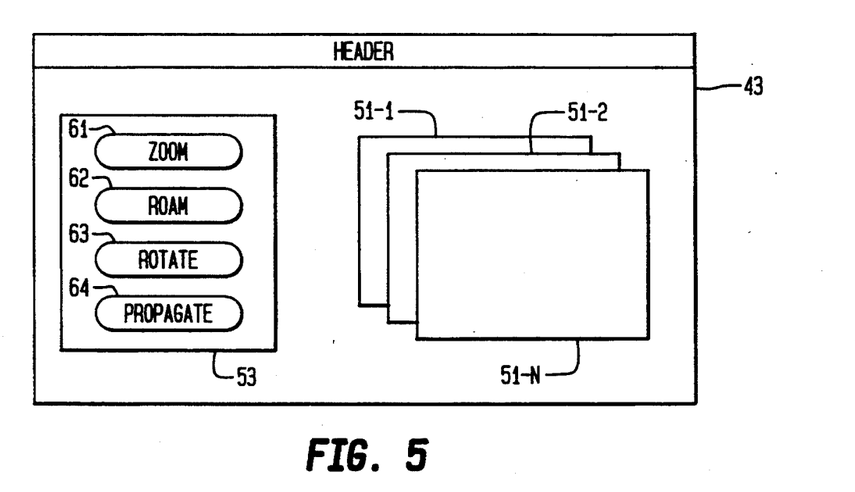
FIG. 5 diagrammatically illustrates a display screen user interface having user controlled image manipulation icons for roam, zoom and rotate and a linking 'propagate' icon that allows an operator to define the manner in which co-registered images are to be manipulated with reference to the coordinate system of a co-registration surface.

FIG. 5 diagrammatically illustrates a plurality of image files 51-1, 51-2, . . . , 51-N that have been imported from a workstation database to display screen 43, using a 'window'-based user interface, such as SunOS Open Windows Version 3.0, identified above. Using this display mechanism the user may import and move among the plural images by executing 'point and click' selections of a user interface icon menu shown at 53. In the illustrated example of available manipulation functions, menu 53 contains manipulation options: zoom 61, roam 62 and rotate 63. It also contains a propagate icon 64. When propagate icon 64 is invoked, an invoked image manipulation function, such as the zoom function 61, propagates among each of the imported images 51-1 . . . 51-3, so that each image is simultaneously manipulated in the same manner as defined by the invoked function.

As described earlier, image manipulation tools currently available for image processing applications are screen-based mechanisms (customarily employed for graphics display applications), operating exclusively in the two-dimensional coordinate system of the display screen. Namely, they are effectively dissociated from the co-registration surface and therefore cannot successfully be employed to manipulate co-registered images that have been projected or translated (by means of a collection geometry model) on such a co-registration surface, such as a terrestrial surface.

In accordance with the present invention, this dissociation of conventional screen-based image manipulation tools from the registration surface employed in multi-image registration applications is successfully remedied by a registration surface-based image manipulation operator with which a user interface, such as that illustrated in FIG. 5, may be coupled. Being registration surface-based, rather than screen-based, the manipulation of the present invention enables the exploiter to accurately manipulate a plurality of images simultaneously, in a manner that maintains registration of each of the images in the intended co-registration surface, and thereby allows the operator to perform a true image information content examination associated with the exploitation process.

Figure 6:
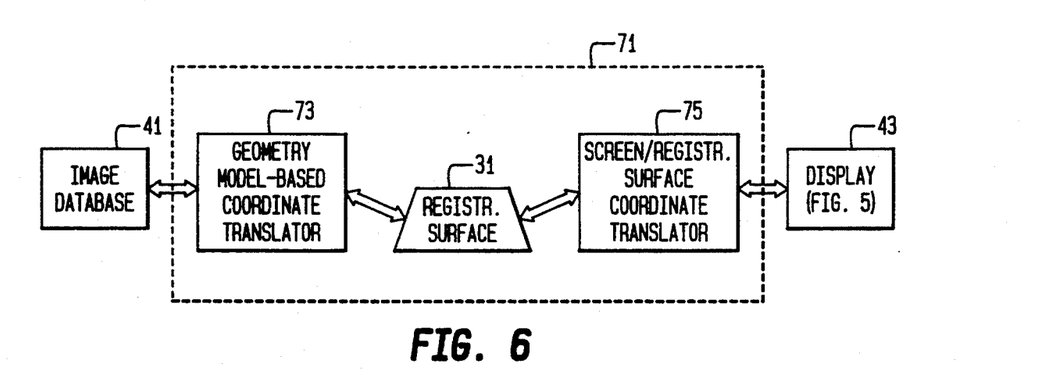
FIG. 6 diagrammatically illustrates the manner in which the present invention interfaces a screen-based user interface with a multiple image database, for enabling a user to manipulate displayed images in their mutually projected co-registration surface.

FIG. 6 diagrammatically illustrates the manner in which the present invention interfaces a screen-based user interface with a multiple image database, for enabling a user to manipulate displayed images in their mutually projected co-registration surface. More specifically, FIG. 6 shows a cascaded mapping mechanism 71, which contains a display screen - registration surface interface 75 and an image database registration - surface interface 73. Display screen - registration surface interface 75 translates (x or horizontal, and y or vertical) coordinate system parameters associated with screen-base image manipulation software for controlling the display of images on display screen 43 to (phi or latitude, and lambda or longitude) parameters of the co-registration surface-based coordinate system associated with registration surface 31. In other words, the display screen coordinate system - surface coordinate system translator 75 converts inputs from the operator, such as manipulation parameters, into registration surface values that are compatible with the collection geometry model of interface 71.

Interface 75 may employ any conventional map projection algorithm to effect a mapping or translation from the registration surface 31 to the display screen 43 and vice versa. As pointed out above, the required mapping function is essentially a translation from latitude and longitude ($\phi$, $\lambda$) coordinates to raster space (x,y) coordinates. The following publications detail mapping algorithms that may be employed to execute the required mapping operation: Map Projections—A Working Manual, by John P. Snyder, U.S. Geological Survey Professional Paper 1395, U.S. Government Printing Office, 2nd Printing 1989; Map Projection Equations, by Frederick Pearson, II, Warfare Analysis Department Naval Surface Weapons Center, Dahlgren Laboratory, Dahlgren, Va. 22448, 1977; and Coordinate Systems and Map Projections, by D. J. Maling, George Philip & Son Limited, London, England, 1973.

An embodiment of the reference surface - display screen mapping interface 75 employed in accordance with the present invention, referred to as an arc digitized mapping, may be described by the following equations:

$$\begin{matrix} \text{Rotation} & \text{Scale} & \text{Translation} \end{matrix}$$

$$\begin{bmatrix} x \\ y \end{bmatrix} = \begin{bmatrix} \sin\theta & \cos\theta \\ \cos\theta & -\sin\theta \end{bmatrix} \begin{bmatrix} k & 0 \\ 0\,k & \cos\phi_o \end{bmatrix} \begin{bmatrix} \phi - \phi_o \\ \lambda - \lambda_o \end{bmatrix}$$

-continued
or $$x = k\sin\theta(\phi - \phi_o) + k\cos\phi_o\cos\theta(\lambda - \lambda_o)$$

$$y = k\cos\theta(\phi - \phi_o) - k\cos\phi_o\sin\theta(\lambda - \lambda_o)$$

where the $\cos\phi_o$ term handles correction for convergence of meridians and the "k" term represents the scale factor to convert meters/degree to meters/pixel. The inverse of these equations maps screen coordinates (x,y) into latitude (phi) and longitude (lambda) coordinates in the registration surface.

The interface 75-mapped registration coordinates within the registration surface (namely, phi, lambda and h (height or elevation of the registration surface at the values of phi and lambda within surface 31)) are transformed by the respective collection geometry models within interface 71 to line and pixel addresses within the respective digital image files of the linked images, resident in image database 41. Mapping from the image database 41 to the display screen 43 is effected by the inverse of the just described cascaded mapping function. Specifically interface 73, which, via the collection geometry models, maps pixels of the image database 41 to latitude and longitude coordinates within registration surface 31, is coupled in cascade with the registration surface-to-screen coordinate transform 75. Thus, through the cascaded mapping function 71, the pixel values at specified image array locations in the database 41 are coupled to an output display driver for presentation as one of a set of images 51 on display 43, images 51 being co-registered in registration surface 31 for exploitation by the user.

As pointed out above, the user may invoke the data file linking mechanism of the 'windows'-based display and manipulation software, illustrated in FIG. 5, which causes a given user-selected screen parameter to propagate among multiple files (here multiple images 51). Thus, the user may specify a given image manipulation operation to be executed with respect to plural images that have been imported into respective windows of the display. As an example, if the operator desires to rotate the co-registered images 51, he invokes the rotate icon 63. By virtue of the screen coordinate - registration surface transform, such as that described above, the requested rotation specified in screen coordinates (degrees clockwise or counter-clockwise relative to vertical) is transformed to a given azimuth value relative to North in the terrestrial co-registration surface. If the operator desires to pan or roam through the co-registered images presented on the display, he invokes the roam icon 62. The selected screen-based x/y direction is converted into a given geographical direction (in terms of latitude (phi) and longitude (lambda) bearings) and rate of travel (e.g. meters or feet per unit time (minute) across the terrestrial co-registration surface. Similarly, if the operator desires to enlarge or zoom-in on the co-registered images presented on the display, he invokes the zoom icon 61. The specified screen magnification is converted into a given spatial resolution between pixels (for example, in meters or yards) on the registration surface. When multiple images are displayed, as is typically the case in a co-registration exploitation exercise, the operator invokes propagate icon 64, which causes the invoked image manipulation function, such as the zoom function 61, to propagate among each of the imported images 51-1 . . . 51-N, whereby each image is simultaneously manipulated in the same manner as defined by the invoked function.

As will be appreciated from the foregoing description, the effective lack of utility of conventional screen-based image manipulation tools in multi-image registration applications, such as those involving multiple digital terrestrial images obtained by a plurality of spaceborne or airborne sensors having differing image collection geometries, which are to be simultaneously manipulated with reference to a common image registration surface, is successfully addressed in accordance with the present invention by means of a registration surface-based image manipulation operator, which allows the exploiter to accurately manipulate one image, or a plurality of images simultaneously, in a manner that maintains registration of the images in the intended co-registration surface, and thereby allows the user to perform a true image information content examination associated with the exploitation process.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a digital image processing system in which plural images of a common scene are derived by a plurality of sensors, observation and image collection parameters of which may be different from one another, and wherein said plural images of said common scene obtained by said plurality of sensors are digitized to form a plurality of digital images, each digital image containing an array of pixels of a prescribed spatial resolution, and wherein plural digital images are translated to a prescribed registration surface in accordance with respective geometric models of said sensors through which said plural digital images were derived, a method of controlling the manner in which plural digital images are displayed by way of an output display device comprising the steps of:

(a) providing a display screen-based user interface which is operative by a user to input data representative of one or more prescribed image manipulation functions;

(b) transforming user input data representative of a selected one of said one or more prescribed image manipulation functions to a set of spatial coordinates located in said prescribed registration surface;

(c) applying said set of spatial coordinates located in said prescribed registration surface to respective ones of said geometric models, so as to convert said set of spatial coordinates to respective sets of pixel array coordinates within said plural digital images; and (d) mapping image pixel values associated with said respective sets of pixel array coordinates within said plural digital images to pixels of said output display device.

2. A method according to claim 1, wherein step (d) comprises applying said respective sets of pixel array coordinates within said plural digital images to respective ones of said geometric models, so as to convert said respective sets of pixel array coordinates to said set of spatial coordinates located in said prescribed registration surface, and transforming said set of spatial coordinates located in said prescribed registration surface to screen coordinates of said output display device.

3. A method according to claim 2, wherein said one or more prescribed image manipulation functions for which user input data is input in step (a) include at least one of zoom, roam and rotate functions.

4. A method according to claim 3, wherein said prescribed image manipulation functions for which user input data is input in step (a) include a propagate function which links said prescribed image manipulation function to each of plural digital images displayed on said output display device.

5. A method according to claim 1, wherein said one or more prescribed image manipulation functions for which user input data is input in step (a) include at least one of zoom, roam and rotate functions.

6. A method according to claim 1, wherein said user input data is defined in terms of a display screen-based coordinate system, and wherein step (b) comprises transforming said display screen-based user input data to a set of latitude and longitude coordinates of said prescribed registration surface.

7. A method according to claim 6, wherein step (c) comprises applying latitude, longitude and elevation coordinates of said prescribed registration surface to said respective ones of said geometric models, so as to convert said latitude, longitude and elevation coordinates to respective sets of line and pixel locations within respective pixel arrays of said plural digital images.

8. A method according to claim 7, wherein step (d) comprises applying said respective sets of line and pixel locations within respective pixel arrays of said plural digital images to said models, so as to convert said respective sets of line and pixel locations to a set of latitude and longitude coordinates of said prescribed registration surface, and transforming said set of latitude and longitude coordinates of said prescribed registration surface to screen coordinates of said output display device.

9. A method according to claim 1, wherein said respective geometric models of sensors through which said plural digital images were derived have been iteratively refined in accordance with a measure of misregistration of said plural digital images on said prescribed registration surface.

10. A method according to claim 9, wherein respective geometric models of first and second sensors through which first and second ones of said plural digital images were derived have been iteratively refined by processing said first and second digital images to obtain plural versions of each of said first and second digital images, having successively reduced spatial resolutions from said prescribed spatial resolution to a prescribed base resolution, correlating edge contents of respective ones of first neighborhoods of pixels associated with a first array of matching points within a first selected resolution version of said first digital image with edge contents of respective ones of second neighborhoods of pixels associated with a second array of matching points within said first selected resolution version of said second digital image, so as to derive a measure of misregistration between said first and second images upon said prescribed registration surface, the contents of each of said first and second neighborhoods of pixels being defined with respect to said prescribed registration surface in accordance with respective first and second geometric models of said first and second sensors, and modifying at least one of said first and second geometric models in accordance with said measure of misregistration, so as to effectively decrease misregistration between said first and second images on said prescribed registration surface.

11. A method according to claim 1, wherein step (a) comprises providing said display screen-based user interface as a windows-based user interface icon, which is operative to enable an operator to interactively input said data representative of said one or more prescribed image manipulation functions.

12. A method according to claim 11, wherein said one or more prescribed image manipulation functions for which user input data is input in step (a) include at least one of zoom, roam and rotate functions.

13. A method according to claim 12, wherein said prescribed image manipulation functions for which user input data is input in step (a) include a propagate function which links said prescribed image manipulation function to each of plural digital images displayed on said output display images.

14. For use with a digital image processing system in which plural images of a common scene are derived by a plurality of sensors, observation and image collection parameters of which may be different from one another, and wherein said plural images of said common scene obtained by said plurality of sensors are digitized to form a plurality of digital images, each digital image containing an array of pixels of a prescribed spatial resolution, and wherein plural digital images are translated to a prescribed registration surface in accordance with respective geometric models of sensors through which said plural digital images were derived, an arrangement for controlling the manner in which plural digital images are displayed by way of an output display device comprising:
   a display screen-based user interface which is operative to accept user input data representative of one or more prescribed image manipulation functions;
   a first coordinate system translator which is operative to transform said user input data representative of a selected one of said one or more prescribed image manipulation functions to a set of spatial coordinates located in said prescribed registration surface;
   a second coordinate system translator which is operative to convert said set of spatial coordinates located in said prescribed registration surface to respective sets of pixel array coordinates within said plural digital images in accordance with respective ones of said geometric models; and
   an image database-to-display screen mapping mechanism which is operative to map image pixel values associated with said respective sets of pixel array coordinates within said plural digital images to pixels of said output display device.

15. An arrangement according to claim 14, wherein said image database-to-display screen mapping mechanism is operative to convert respective ones of said plural sets of pixel array coordinates to said set of spatial coordinates located in said prescribed registration surface, in accordance with respective ones of said geometric models, and to transform said set of spatial coordinates located in said prescribed registration surface to screen coordinates of said output display device.

16. An arrangement according to claim 15, wherein said one or more prescribed image manipulation functions for which user data is input to said display screen-based user interface include at least one of zoom, roam and rotate functions.

17. An arrangement according to claim 16, wherein said display screen-based user interface contains a propagate function icon the invoking of which links said prescribed image manipulation function to each of plural digital images displayed on said output display device.

18. An arrangement according to claim 14, wherein said one or more prescribed image manipulation functions for which user data is input to said display screen-based user interface include at least one of zoom, roam and rotate functions.

19. An arrangement according to claim 14, wherein said user input data is defined in terms of a display screen-based coordinate system, and wherein said first coordinate system translator is operative to transform said display screen-based user input data to a set of latitude and longitude coordinates of said prescribed registration surface.

20. An arrangement according to claim 19, wherein said second coordinate system translator is operative to convert latitude, longitude and elevation coordinates of said prescribed registration surface in accordance with said respective ones of said geometric models, to respective sets of line and pixel locations within respective pixel arrays of said plural digital images.

21. An arrangement according to claim 20, wherein said image database-to-display screen mapping mechanism is operative to convert a respective set of line and pixel locations of an image database to a set of latitude and longitude coordinates of said prescribed registration surface, and to transform said set of latitude and longitude coordinates of said prescribed registration surface to screen coordinates of said output display device.

22. An arrangement according to claim 14, wherein said display screen-based user interface is operative to display at least one windows-based user interface icon to enable an operator to interactively input said data representative of said one or more prescribed image manipulation functions.

23. An arrangement according to claim 20, wherein said one or more prescribed image manipulation functions for which user input data is input include at least one of zoom, roam and rotate functions.

24. An arrangement according to claim 23, wherein said prescribed image manipulation functions for which user input data is input include a propagate function which links said prescribed image manipulation function to each of plural digital images displayed on said output display images.

25. An arrangement according to claim 14, wherein said respective geometric models of sensors through which said plural digital images were derived have been iteratively refined in accordance with a measure of misregistration of said plural digital images on said prescribed registration surface.

26. An arrangement to claim 25, wherein respective geometric models of first and second sensors through which first and second ones of said plural digital images were drived have been iteratively refined by processing said first and second digital images to obtain plural versions of each of said first and second digital images, having successively reduced spatial resolutions from said prescribed spatial resolution to a prescribed base resolution, correlating edge contents of respective ones of first neighborhoods of pixels associated with a first array of matching points within a first selected resolution version of said first digital image with edge contents of respective ones of second neighborhoods of pixels associated with a second array of matching points within said first selected resolution version of said second digital image, so as to derive a measure of misregistration between said first and second images upon said prescribed registration surface, the contents of each of said first and second neighborhoods of pixels being defined with respect to said prescribed registration surface in accordance with respective first and second geometric models of said first and second sensors, and modifying at least one of said first and second geometric models in accordance with said measure of misregistration, so as to effectively decrease misregistration between said first and second images on said prescribed registration surface.

* * * * *